(12) United States Patent
Melanson et al.

(10) Patent No.: US 8,487,797 B2
(45) Date of Patent: *Jul. 16, 2013

(54) AUDIO CLOCKING IN VIDEO APPLICATIONS

(75) Inventors: John L. Melanson, Austin, TX (US); Mark P. Rygh, Union City, CA (US)

(73) Assignee: Magnum Semiconductor, Inc., Milpitas, CA (US)

( * ) Notice: Subject to any disclaimer, the term of this patent is extended or adjusted under 35 U.S.C. 154(b) by 335 days.

This patent is subject to a terminal disclaimer.

(21) Appl. No.: 12/889,327

(22) Filed: Sep. 23, 2010

(65) Prior Publication Data

US 2011/0016344 A1   Jan. 20, 2011

Related U.S. Application Data

(60) Continuation of application No. 12/543,509, filed on Aug. 19, 2009, now Pat. No. 8,378,867, which is a division of application No. 10/856,436, filed on May 28, 2004, now Pat. No. 7,587,131.

(51) Int. Cl.
*H03M 3/00* (2006.01)

(52) U.S. Cl.
USPC .............................. 341/143; 341/61; 341/144

(58) Field of Classification Search
USPC ........................................ 341/61, 143, 144
See application file for complete search history.

(56) References Cited

U.S. PATENT DOCUMENTS

| | | | |
|---|---|---|---|
| 5,473,385 A | 12/1995 | Leske | |
| 5,506,932 A | 4/1996 | Holmes et al. | |
| 5,664,044 A | 9/1997 | Ware | |
| 5,715,356 A | 2/1998 | Hirayama et al. | |
| 6,215,423 B1 | 4/2001 | May et al. | |
| 6,650,258 B1 | 11/2003 | Kelly et al. | |
| 7,030,931 B2 | 4/2006 | Eckhardt et al. | |
| 7,587,131 B1 * | 9/2009 | Melanson et al. | 386/204 |

\* cited by examiner

*Primary Examiner* — Khai M Nguyen
(74) *Attorney, Agent, or Firm* — Maryam Imam; Jack V. Musgrove

(57) ABSTRACT

A method of operating an electronic video device such as a DVD player, wherein video clock signals and audio clock signals are derived from a system clock signal using two phase-lock loops, and these video and audio clock signals are used to process encoded video data and encoded audio data, but digital-to-analog conversion of the audio data stream is controlled by the system clock signal rather than the audio clock signals. By using the system clock signal to control the audio digital-to-analog converter (DAC), the DAC avoids the poor performance issues that can arise from jitter introduced into the audio clock signals by the PLL. The system clock signal may be divided by an integer to generate the sampling clock for the audio DAC. In the illustrative embodiment, the system clock signal has a rate which is not an integer multiple of the sample rate of the audio data stream.

6 Claims, 3 Drawing Sheets

AUDIO CLOCKING IN VIDEO APPLICATIONS

CROSS-REFERENCE TO RELATED APPLICATION

This application is a continuation of U.S. patent application Ser. No. 12/543,509 filed Aug. 19, 2009 now U.S. Pat. No. 8,378,867, which is a divisional of U.S. patent application Ser. No. 10/856,436 filed May 28, 2004, now U.S. Pat. No. 7,587,131.

BACKGROUND OF THE INVENTION

1. Field of the Invention

The present invention generally relates to clocking systems for electronic circuits, and more particularly to a method of generating clocking signals for audio components in an electronic video device.

2. Description of the Related Art

Various types of electronic circuits have been constructed that support a wide range of different clock modes. For example, digital data converters used in audio and video devices (players or recorders) can operate in different speed modes wherein different master clock rates and sample clock rates are used. A digital-to-analog converter in such a device might have two operating modes, such as a base mode and a high mode, depending on what master clock rate and sample clock rate are being provided from the front-end circuitry. This capability allows a single converter to support multiple applications, and gives the end-user (i.e., the final product manufacturer) greater flexibility in the design of the overall electronic system.

A typical clocking system for a conventional digital versatile disc (DVD) player 10 is illustrated in FIG. 1. A piezoelectric crystal 12 is used by an oscillator 14 to create a master clock signal which is fed to two phase-lock loops (PLLs) 16 and 18. In a typical video system, oscillator 14 provides a 27 megahertz (MHz) signal which facilitates clock generation for both U.S. and international video standards. Audio PLL 16 provides an audio clock signal for an audio processing unit 20, and optional video PLL 18 provides a video clock signal for a video processing unit 22. For high performance video systems, the video PLL may be used to multiply the clock to a higher frequency, such as 54 MHz for 108 MHz. An optical reader 24 reads the information optically recorded on the DVD and provides data signals to audio processing unit 20 and video processing unit 22. Audio processing unit 20 and video processing unit 22 provide various digital signal processing (DSP) functions, such as decompression of encoded audio and video data streams. The decompressed digital audio data stream is fed to a first digital-to-analog controller 26, and the decompressed digital video data stream is fed to a second digital-to-analog controller (DAC) 28. DAC 26 produces the audio output of DVD player 10, and DAC 28 produces the video output of DVD player 10. These outputs drive the audio and video output ports of DVD player 10 which allow interconnection to audio and video devices, i.e., speakers and a display.

DAC 26 is controlled by clock signals provided from audio PLL 16, and DAC 28 is controlled by clock signals provided from video PLL 18. For example, DAC 26 receives a master clock signal and a sample rate clock signal which are used to sample the digital audio data from audio processing unit 20 and generate the proper analog audio output. The master clock signal might be in the range of 8 MHz to 34 MHz, and the sample rate clock signal might be in the range of 32 kilohertz (kHz) to 192 kHz. The master clock is normally a multiple (such as 256) of the base sampling rate. In a typical digital-to-analog converter, a delta-sigma modulator feeds a multilevel noise-shaped signal based on the digital input stream to a back-end analog filter which removes high frequencies from the output. The clock signals from audio PLL 16 are used by internal components of DAC 26 such as the delta-sigma modulator and the analog filter. As the audio master clock, e.g. 44100*256 Hz, is not a simple rational multiplier of the master crystal oscillator, the quality of the clock typically suffers due to a low frequency of the lock signal and typical PLL noise issues. While it is possible to build clock generation systems that avoid this noise, most video systems have audio clocks with significant jitter and phase noise.

Data converters can be quite sensitive to clock noise and jitter. Jitter can move the effective sampling time of the signal, causing modulation sidebands and distortion. This situation is especially true for high-frequency, high-level signals. Additionally, the out-of-band modulation noise in delta-sigma structures can be de-modulated to become in-band noise signals. These effects degrade both dynamic range, and signal-to-noise ratio (SNR) measurements.

One problem that can arise in providing these critical timing signals to DAC 26 relates to the jitter associated with audio PLL 16. A phase-lock loop is a feedback device which includes a phase/frequency detector, a low-pass filter, and a voltage-controlled oscillator (VCO). The phase/frequency detector compares two input signals, a reference signal (from the external system clock, i.e., oscillator 14) and a feedback signal, and generates a phase error signal that is a measure of their phase difference. The phase error signal from the detector is filtered by the low-pass filter and fed into the control input of the VCO. The VCO generates a periodic signal with a frequency which is controlled by the filtered phase error signal. The VCO output is coupled to the feedback input of the phase/frequency detector, thereby forming a feedback loop. If the frequency of the feedback signal is not equal to the frequency of the reference signal, the filtered phase error signal causes the VCO frequency to shift toward the frequency of the reference signal, until the VCO finally locks onto the frequency of the reference. The output of the VCO is then used as the synchronized signal.

Jitter can be introduced into the feedback loop due to the "dead zone." The phase error signal that controls the VCO has a first polarity in the case where the reference signal has a phase lag, and the other polarity when a phase lead is detected. For very small phase differences (e.g., the zero-phase error, steady-state condition of the locked PLL), in the transition from one polarity to the other there is often a region referred to as the dead zone where the phase error signal is insensitive to phase-difference changes. In this dead zone (or dead band), the VCO's eventual output signal is unpredictable and liable to dither. Additionally, noise may be injected into the VCO from other circuitry that is above the corner frequency of the PLL feedback loop.

In light of the foregoing, it would be desirable to devise an improved method of providing clock signals to audio components of an electronic video device which could avoid the performance problems associated with PLL jitter. It would be further advantageous if the method could be implemented without significantly increasing hardware size.

SUMMARY OF THE INVENTION

It is therefore one object of the present invention to provide an improved method and system of clocking audio components in an electronic video device such as a DVD player.

It is another object of the present invention to provide such a method and system which allow certain audio components that are more sensitive to clock quality to be driven by a more stable clock signal.

It is yet another object of the present invention to provide an improved clocking system for a digital-to-analog converter used in audio signal processing.

The foregoing objects are achieved in a method of operating an electronic video device, generally comprising the steps of generating a system clock signal, deriving video clock signals from the system clock signal using a first phase-lock loop and deriving audio clock signals from the system clock signal using a second phase-lock loop, processing encoded video data using the video clock signals to generate a video data stream and processing encoded audio data using the audio clock signals to generate an audio data stream, converting the video data stream into video output using the clock signals, and converting the audio data stream into audio output using the system clock signal. By using the system clock signal to control the audio digital-to-analog converter (DAC) rather than the audio clock signals, the DAC avoids the poor performance issues that can arise from the jitter introduced into the audio clock signals by the PLL. The system clock signal may be divided by an integer to generate the sampling clock for the audio DAC. In the illustrative embodiment, the system clock signal has a rate which is not an integer multiple of the sample rate of the audio data stream. For example, the system clock rate might be 27 MHz while the sample rate of the audio data stream is 44.1 kHz. More generally, the system clock signal preferably has a rate of 108lN MHz, where N is an integer. An N of 16 would give an audio converter rate of 6.75 MHz, which is an appropriate frequency for a delta-sigma audio converter. A sample rate conversion (SRC) unit in the audio DAC is used to convert the sample rate of the audio data stream to the rate of the system clock signal. The SRC unit feeds the converted stream to a delta-sigma modulator which produces a multilevel noise-shaped signal based on the output digital data stream, and an analog filter passes the multilevel noise-shaped signal to the audio output port. The invention may be implemented in a variety of electronic video players such as a DVD player.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The present invention is directed to a method and system for providing clock signals to audio components in an electronic video device, and is useful in a variety of video applications. For purposes of illustration, the invention is described below in the context of a digital video disc (DVD) player, but those skilled in the art will appreciate that the invention is not limited to this application and can be implemented in other types of video players as well as video recorders.

Figure 1:
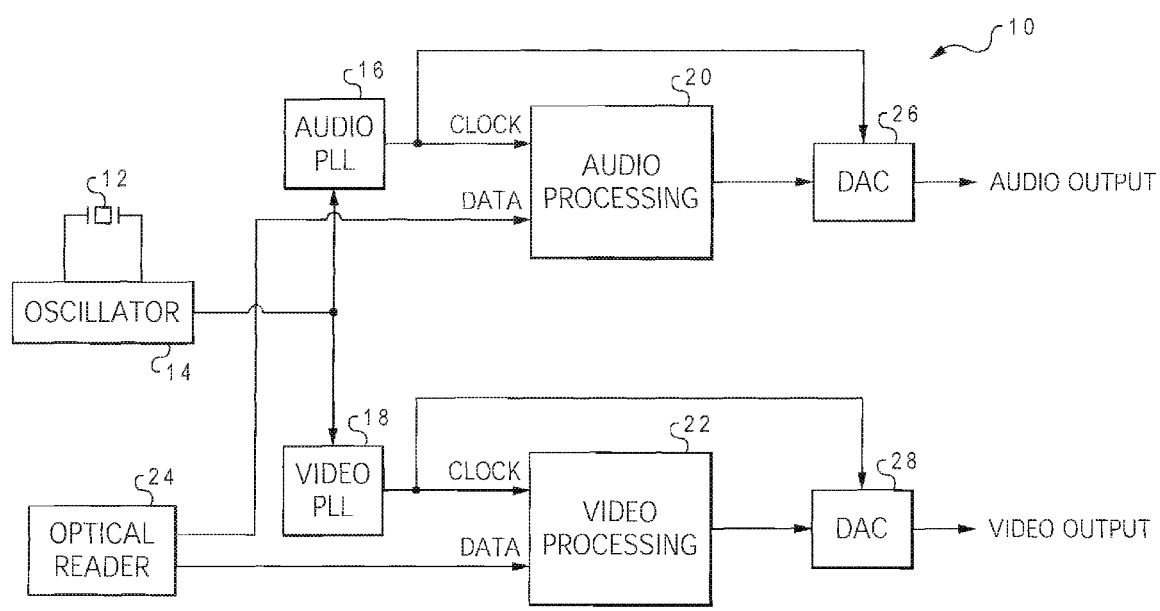
FIG. 1 is a block diagram of a conventional digital video disc (DVD) player having video and audio processing units which are controlled by clocking signals from respective video and audio phase-lock loops (PLLs)
Figure 2:
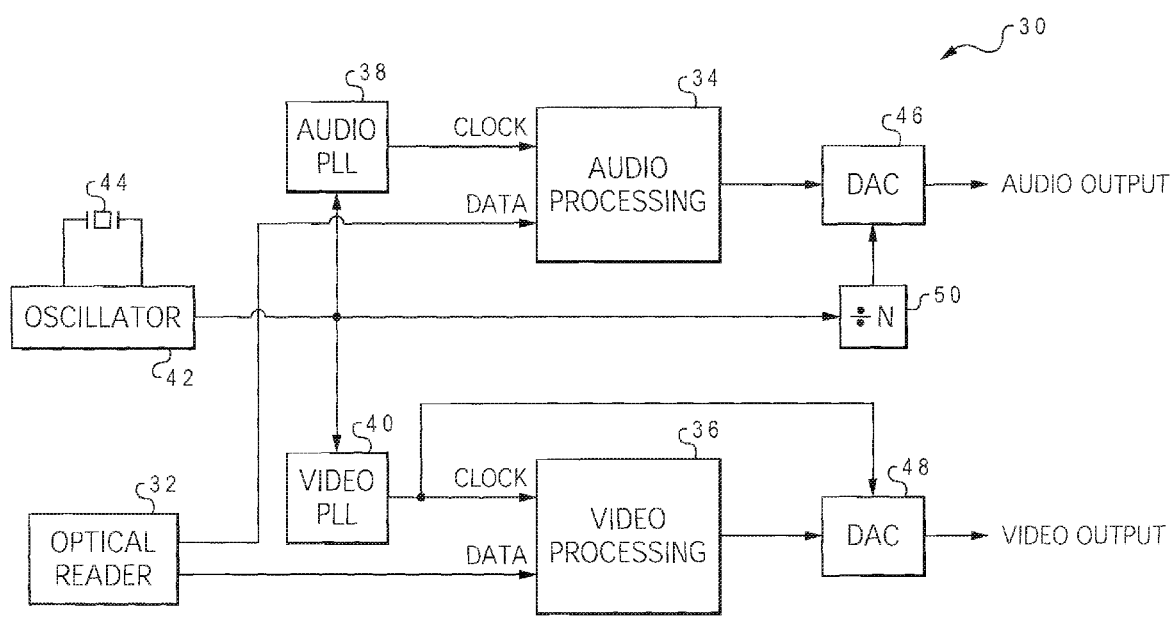
FIG. 2 is a block diagram of one embodiment of a DVD player constructed in accordance with the present invention wherein a portion of the audio processing is controlled by clock signals from an audio PLL, while the digital-to-analog converter (DAC) for the audio processing is controlled by a separate clock signal derived from the system clock.

With reference now to FIG. 2, there is depicted one embodiment of a DVD player 30 constructed in accordance with the present invention. DVD player 30 includes an optical reader 32 which reads the digitally-encoded audio and video information optically recorded on the DVD. Optical reader 32 provides separate outputs for the encoded (compressed) audio and video data. The audio data is sent to an audio processing unit 34, and the video data is sent to a video processing unit 36. Audio processing unit 34 and video processing unit 36 may provide various digital signal 15 processing (DSP) functions including decompression of the encoded audio and video data streams. Audio processing unit 34 and video processing unit 36 are controlled by clock signals generated at respective audio and video phase-lock loops (PLLs) 38 and 40. The audio and video PLL clock signals are derived from a system clock signal produced by oscillator 42 using a piezoelectric crystal 44. The output of audio processing unit 34 is 20 connected to an audio digital-to-analog converter (DAC) 46, and the output of video processing unit 36 is connected to a video DAC 48. The output of audio DAC 46 is the audio output for DVD player 30, and the output of video DAC 48 is the video output for DVD player 30.

While the present invention provides an advantageous and novel clocking system for DVD player 30, many of the individual components of player 30 are of conventional design (e.g., optical reader 32, oscillator 42, audio and video PLLs 38 and 40, audio and video processing units 34 and 36, and video DAC 48). The details of these components are accordingly beyond the scope of the present invention but will become apparent to the system designer upon reference to this disclosure.

In the illustrative embodiment, exemplary oscillator 42 derives the system clock from a 27 MHz crystal. A system clock of 27 MHz easily drives both National Telecommunications Standards Committee (NTSC) and Progressive Alternating Line (PAL) devices. This value is exemplary and may vary depending upon the application. Integer multiples of 27 MHz (e.g., 54 MHz) are suitable as well.

The audio and video PLL clocks are derived from the 27 MHz system clock. Audio PLL 38 produces a master clock signal and a sample rate clock signal for audio processing. The master clock signal is a multiple (such as 256) of the base audio sampling rate. In this embodiment, the master clock is 11.2896 MHz, and the sample rate clock 44.1 kHz. Video PLL 40 also produces a master clock signal for video processing, for example, 54 MHz. These values are exemplary and other rates could be used, e.g., a 48 kHz sample rate clock.

Some components such as DACs can be more sensitive to clock quality and are particularly subject to poor performance associated with PLL jitter. The present invention avoids this problem by using the system clock (27 MHz) provided by oscillator 42 for audio conversion, and sample rate converting the audio data stream using a clock rate of 27 MHz/N where N is an integer. In this implementation, the signal from oscillator 42 is input to a divider 50 whose output provides the clock signal to DAC 46. For example, divider 50 can divide the signal by 4 to present a 6.75 MHz clock to the audio DAC. DAC 46 can use clock signals derived from the 27 MHz system clock, even though it is not an integer multiple of the sample rate for the audio data stream (44.1 kHz), by using sample rate conversion. More generally, it is preferable to operate DAC 46 at a rate of 108/N MHz, where N is an integer.

Figure 3:
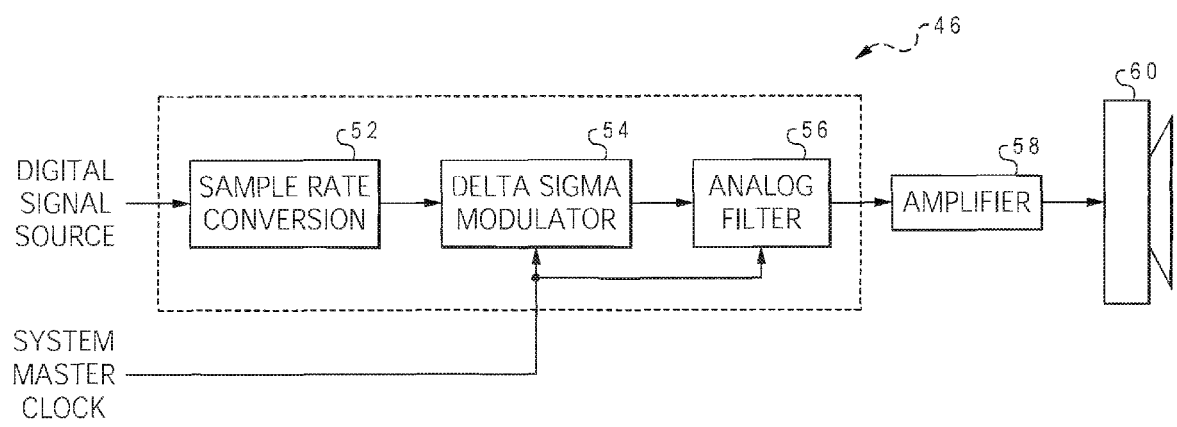
FIG. 3 is a block diagram of one embodiment of the DAC used in the DVD player of FIG. 2 and constructed in accordance with the present invention, illustrating clock control of the delta-sigma modulator and analog filter.

FIG. 3 illustrates one embodiment of DAC 46. The 44.1 kHz data stream is fed into a sample rate conversion (SRC) unit 52. SRC unit 52 has the ratio of the base audio sample rate (44.1 kHz) to the system-derived sample rate (13.5 MHz) and uses interpolation to convert the data stream. Inclusion of SRC unit 52 in the design of DAC 46 does not significantly increase the overall hardware size of the device. SRC 52 can be designed to be simpler than general-case SRC units, as the output sampling rate is always quite high with respect to the signal bandwidth. The output of SRC unit 52 is provided to a delta-sigma modulator 54. Delta-sigma modulator 54 feeds a multilevel noise-shaped signal based on the digital input stream to an analog filter 56. Delta-sigma modulator 54 can be operated at 6.75 MHz for switched capacitor systems, or directly at 27 MHz for continuous time systems. Analog filter 56 is preferably a continuous-time filter. Analog filter 56 removes high frequencies from the output, and the filtered output then drives some other device such as an amplifier 58 and speaker 60. Amplifier 58 and speaker 60 may be internal or external to DVD player 30.

As the audio clock is no longer used to clock any critical converter resources, the audio clock no longer needs to be a smooth, continuous clock; rather, the audio clock only needs to have the right average frequency such that the appropriate amount of audio data is processed in a given macroscopic time. The system may be designed without any PLL and true audio clock, allowing a bursty transfer clock for audio derived directly from the system clock.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of operating an electronic video device, comprising:
    generating a system clock signal;
    deriving one or more video clock signals from the system clock signal;
    deriving an audio converter clock signal from the system clock signal;
    processing encoded video data to generate a video data stream sampled at a video sample rate;
    processing encoded audio data to generate an audio data stream sampled at an audio sample rate;
    converting the video data stream into video output using the one or more video clock signals; and
    converting the audio data stream into audio output using the audio converter clock signal, wherein the frequency of the audio converter clock signal is a non-integer multiple of the audio sample rate.

2. The method of claim 1 wherein the audio converter clock signal has a frequency equal to the frequency of the system clock signal multiplied by N/M, where N and M are integers.

3. The method of claim 1 wherein said step of deriving the audio converter clock signal derives an audio master clock signal and an audio sample signal, the system clock signal having a rate which is not an integer multiple of a rate of the audio sample signal.

4. The method of claim 1 wherein the audio converter clock signal has a frequency equal to 27 MHz multiplied by N/M, where N and M are integers and M is less than or equal to 16.

5. The method of claim 1 wherein the audio converter clock signal has a frequency equal to 54 MHz multiplied by N/M, where N and M are integers and M is less than or equal to 32.

6. The method of claim 1 wherein the audio converter clock signal has a frequency equal to 108 MHz multiplied by N/M, where N and M are integers and M is less than or equal to 64.

\* \* \* \* \*